(12) United States Patent
Sinha et al.

(10) Patent No.: US 8,574,790 B2
(45) Date of Patent: Nov. 5, 2013

(54) FUEL CELL ELECTRODES WITH GRADED PROPERTIES AND METHOD OF MAKING

(75) Inventors: Puneet K. Sinha, Rochester, NY (US); Balasubramanian Lakshmanan, Pittsford, NY (US); Scott C. Moose, Victor, NY (US); Nalini Subramanian, Pittsford, NY (US)

(73) Assignee: GM Global Technology Operations LLC, Detroit, MI (US)

( * ) Notice: Subject to any disclaimer, the term of this patent is extended or adjusted under 35 U.S.C. 154(b) by 373 days.

(21) Appl. No.: 12/896,981

(22) Filed: Oct. 4, 2010

(65) Prior Publication Data

US 2012/0082917 A1    Apr. 5, 2012

(51) Int. Cl.
*H01M 8/00*    (2006.01)
*H01M 4/02*    (2006.01)
*B05D 5/12*    (2006.01)

(52) U.S. Cl.
USPC ............................. 429/535; 429/423; 427/115

(58) Field of Classification Search
USPC .................................. 429/523, 535; 427/115
See application file for complete search history.

(56) References Cited

U.S. PATENT DOCUMENTS

| | | | |
|---|---|---|---|
| 2002/0045713 A1* | 4/2002 | Feiring et al. | 525/326.2 |
| 2005/0183768 A1* | 8/2005 | Roscheisen et al. | 136/263 |
| 2008/0096080 A1* | 4/2008 | Batawi et al. | 429/33 |
| 2010/0047657 A1* | 2/2010 | MacKinnon et al. | 429/33 |

\* cited by examiner

*Primary Examiner* — Patrick Ryan
*Assistant Examiner* — Muhammad Siddiquee
(74) *Attorney, Agent, or Firm* — Dinsmore & Shohl LLP

(57) ABSTRACT

A graded electrode is described. The graded electrode includes a substrate; and at least two electrode layers on the substrate forming a combined electrode layer, a composition of the at least two electrode layers being different, the combined electrode layer having an average level of the property that changes across the substrate. Fuel cells using graded electrodes and methods of making graded electrodes are also described.

7 Claims, 4 Drawing Sheets

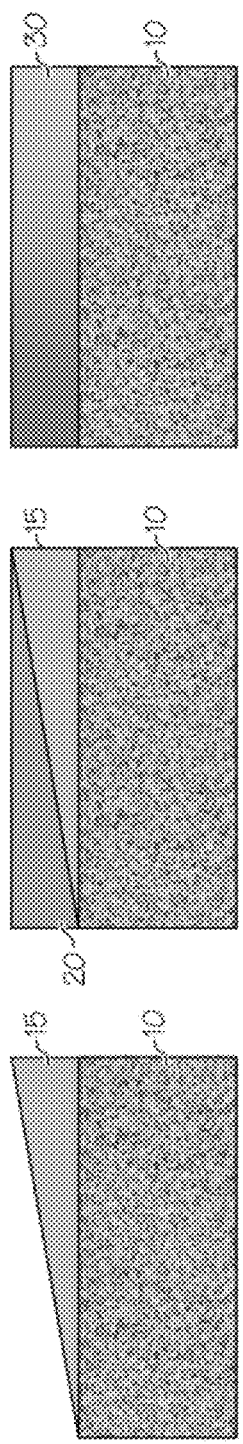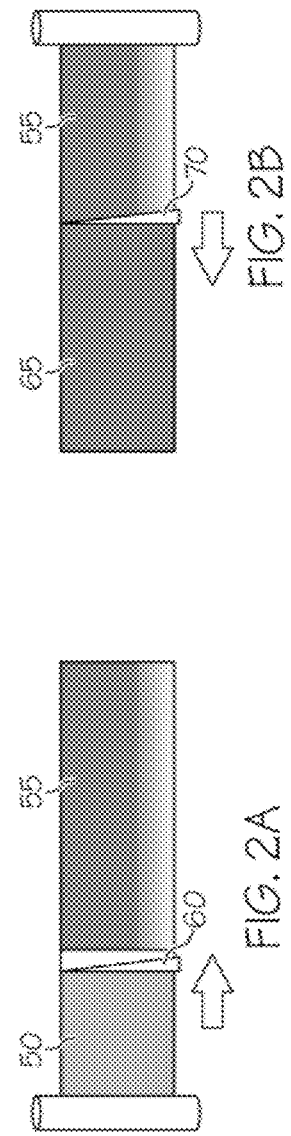

FUEL CELL ELECTRODES WITH GRADED PROPERTIES AND METHOD OF MAKING

FIELD OF THE INVENTION

The present invention relates generally to electrodes for fuel cells, and specifically to electrodes having graded properties, and methods of making them.

BACKGROUND OF THE INVENTION

Electrochemical conversion cells, commonly referred to as fuel cells, produce electrical energy by processing reactants, for example, through the oxidation and reduction of hydrogen and oxygen. A typical polymer electrolyte fuel cell comprises a polymer membrane (e.g., a proton exchange membrane (PEM)) with catalyst layers on both sides (catalyst coated membrane (CCM)). The catalyst coated PEM is positioned between a pair of gas diffusion media layers (DM), and a cathode plate and an anode plate are placed outside the gas diffusion media layers. The components are compressed to form the fuel cell.

In order to form a CCM, the electrode ink can be deposited directly on the PEM, or it can be deposited on a decal substrate and transferred to the PEM.

Depending on the fuel cell design, catalyst coated diffusion media (CCDM), in which the catalyst is coated on the DM rather than the PEM, sometimes have advantages over CCM. Gas diffusion media in PEM fuel cells are normally composed of a layer of a conductive porous substrate, such as carbon fiber paper or carbon cloth, with a microporous layer (MPL) thereon. The MPL normally contains carbon powders and hydrophobic fluoropolymers. Traditionally, CCDM are prepared by coating a catalyst containing ink directly on the gas diffusion layer, more precisely onto the MPL.

Typically, in the fuel cell, the operating conditions are not uniform from the stack inlet to the stack outlet. For example, relative humidity (RH) increases from the inlet to the outlet, while $O_2$ partial pressure decreases.

Therefore, there is a need for adjusting the electrode/MEA properties along the flow direction.

SUMMARY OF THE INVENTION

The present invention meets this need. One aspect of the invention is a method of making a graded electrode. In one embodiment, the method includes preparing at least two electrode ink mixtures having different compositions; and depositing the at least two electrode inks on a substrate forming at least two electrode layers combined to form a combined electrode so that an average level of a property of the combined electrode layer changes across the substrate.

Another aspect of the invention is a graded electrode. In one embodiment, the graded electrode includes a substrate; and at least two electrode layers on the substrate forming a combined electrode layer, a composition of the at least two electrode layers being different, the combined electrode layer having an average level of the property that changes across the substrate.

Another aspect of the invention is a fuel cell. In one embodiment, the fuel cell includes a polymer exchange membrane; a pair of graded electrodes on opposite side of the polymer exchange membrane, the pair of graded electrodes comprising: at least two electrode layers forming a combined electrode layer, the combined electrode layer having an average level of a property that changes across the combined electrode layer, a pair of electrode plates on opposite sides of the polymer exchange membrane; and a pair of gas diffusion media on opposite sides of the polymer exchange membrane positioned between the graded electrode and the electrode plate.

BRIEF DESCRIPTION OF THE DRAWINGS

The following detailed description can be best understood when read in conjunction with the following drawings, where like structure is indicated with like reference numerals, where various components of the drawings are not necessarily illustrated to scale, and in which:

FIGS. 1A-C are an illustration of one embodiment of a method of making the graded gas diffusion media.

FIGS. 2A-B are an illustration of another embodiment of a method of making the graded gas diffusion media.

FIG. 3 is an illustration of another embodiment of a method of making a graded gas diffusion media.

DETAILED DESCRIPTION

Figure 4:
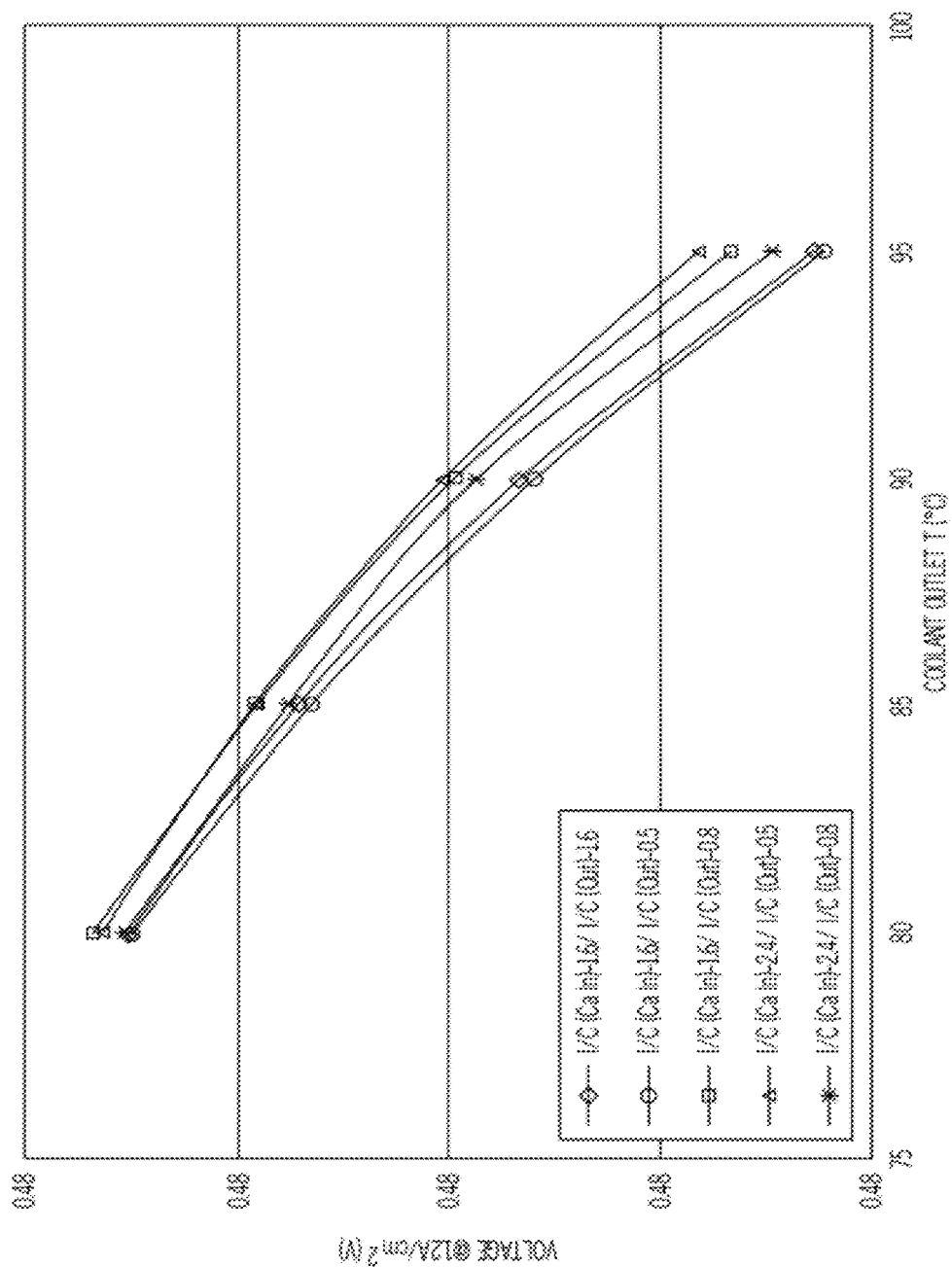
FIG. 4 is a graph showing a comparison of the performance of parts having graded and uniform electrodes.

The ability to make electrodes having graded properties enables tailoring the electrochemical and transport properties of the electrode across the fuel cell active area. Electrochemical and transport properties which can be graded include, but are not limited to, membrane equivalent weight, diffusion media gas permeability, ionomer to carbon ratio, catalyst loading, porosity, and combinations thereof.

In one embodiment, electrodes having graded properties can be made by depositing two (or more) catalyst layers having different levels of a particular property adjacent to a substrate. The substrate can be porous or non-porous as desired. Suitable substrates include but are not limited to, gas diffusion media, the PEM, or a decal substrate. For example, the thickness of the first catalyst layer having one level of a particular property can be changed across the width of the substrate, and then the thickness of the second catalyst layer having a different level of that property can be changed across the width of the substrate. As a result, the average level of the property in the combined layer will vary across the width of the substrate.

One way to accomplish this thickness variation is to apply a layer having one level of the property and a uniform thickness, and using a doctor blade to remove part of the layer. The doctor blade could be slanted so that one side was thicker than the other. Then a second layer with a different level of the property would be applied. The thickness of the second layer could be greater than needed for the final thickness, and a doctor blade could be used to provide the desired thickness and to ensure an even upper surface. The thickness of the second layer would be the reverse of the first layer, e.g., thin part of the first layer would be the thick part of the second layer and vice versa. The first layer would generally have to be at least partially dried before the second layer was applied.

In some situations, when the doctoring process is used with a porous substrate, the capillary absorption of the ink may need to be taken into account.

The substrate and coating sequence should be properly selected. For example, if a non-porous substrate is coated with a porous layer and recoated with a second layer after drying, air bubbles may form because there is no outlet for the air in the first porous layer. Either a porous substrate should be selected or a different coating sequence should be used.

The graded electrode can include two or more graded electrode layers adjacent to the substrate to form the combined layer. By adjacent, we mean next to, but not necessarily directly next to. There can be one or more layers between adjacent layers and/or the substrate. The additional layers can be graded or ungraded electrode layers, for example.

The process for making the graded electrode can be a batch process or a continuous process, as desired.

For the sake of convenience, in the following discussion, the property being changed is the ionomer to carbon ratio, and the substrate is a gas diffusion media. However, it is to be understood that other properties could also be changed in a similar manner, either singly or in various combinations, and the substrate could be any suitable substrate, such as gas diffusion media, PEM, or decal substrate.

FIGS. 1A-C are illustrations of one batch method of making the graded electrode. As shown in FIG. 1A, the gas diffusion media 10 has a first electrode layer 15 deposited thereon. The first electrode layer 15 varies in thickness from one side of the gas diffusion media 10 to the other. The first electrode layer 15 has a first ionomer to carbon ratio. As shown in FIG. 1B, a second electrode layer 20 with a second ratio of ionomer to carbon is deposited over the first electrode layer 15. The second electrode layer 20 varies in thickness from one side of the gas diffusion media to the other, but in reverse from the first layer. This yields a combined electrode layer 30 in which the ionomer to carbon ratio varies from one side to the other, as shown in FIG. 1C.

The electrode layers can be deposited using any suitable method to obtain a thickness variation across the layer. Suitable methods include but are not limited to, depositing a layer having a substantially uniform thickness and using a doctor blade having a height variation across its length to control the thickness, using a comma coater, or using a slot die. The slot die process would require a customized die which would meter the material in a non-uniform way across the width. Because of the minimum wet thickness that is required to coat using a slot die, portions may not be coated and would be unusable Roll processes are illustrated in FIGS. 2 and 3. In the process shown in FIG. 2, the gas diffusion media 50 is unrolled and the first electrode layer 55 is deposited on it, using a slanted doctor blade 60 as described above, for example. The gas diffusion media 50 with the first electrode layer 55 on it is rewound. The process is then reversed for the deposition of the second electrode layer 65. The gas diffusion media 50 with the first electrode layer 55 on it is unwound and the second electrode layer 65 is deposited using a slanted doctor blade 70 as described, for example.

A continuous roll method is shown in FIG. 3. The gas diffusion media is unwound and the first electrode layer 55 is deposited using the slanted doctor blade 60. The second electrode layer 65 is then deposited using the second slanted doctor blade 70. The slant of the second doctor blade 70 is reversed compared to the first doctor blade 60 so that the thin part of the first electrode layer 55 has the thick part of the second electrode layer over it and the thick part of the first electrode layer has the thin part of the second electrode layer over it.

A number of different graded diffusion media were made using the batch process described above. The diffusion media were distinguished from each other based on different ratios of ionomer to carbon, keeping the other material properties the same. The graded gas diffusion media were used in MEAs and tested.

FIG. 4 is a graph comparing the initial performance of various graded gas diffusion media with gas diffusion media having a uniform I/C ratio. The cathode inlet pressure was 194 KPa, the inlet RH for the anode and cathode were 33% and 46% respectively, and the anode and cathode stoichiometry were 1.8. As seen in FIG. 4, MEAs made with graded properties in the electrode showed up to about 20 mV higher performance at 95° C. and similar performance at 80° C.

The level of improvement for the property will vary depending on the property and the process used in making the graded electrode layer. The improvement can be optimized for the property and process.

Figure 5:
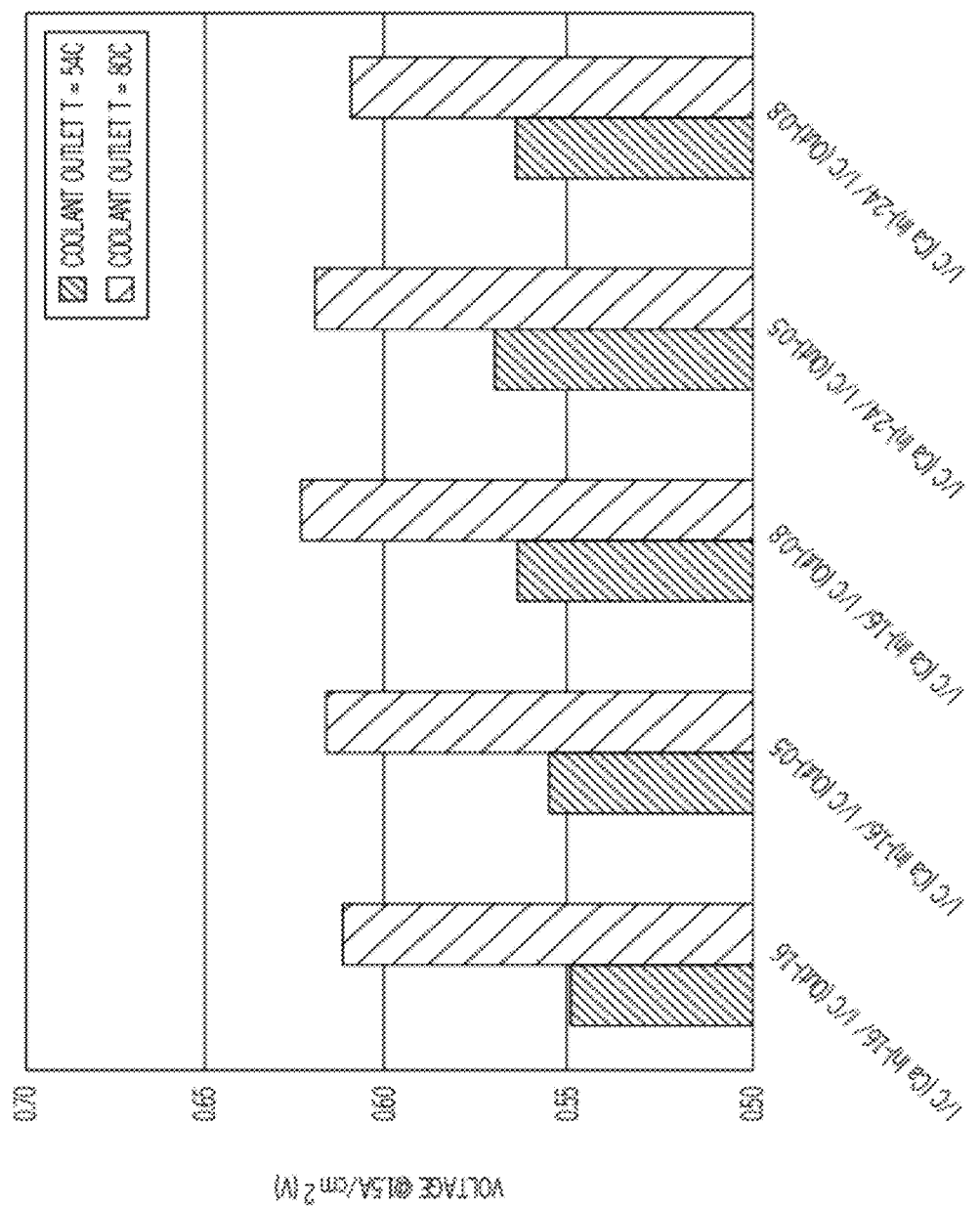
FIG. 5 is a graph showing a comparison of the performance of parts having graded and uniform electrodes.

FIG. 5 is a graph comparing the initial performance of various graded diffusion media with gas diffusion media having a uniform I/C ratio at different temperatures and 100% RH for both the anode and cathode. The graded diffusion media showed up to about 20 mV higher performance at 54° C. and up to about 10 mV higher performance at 80° C.

Figure 6:
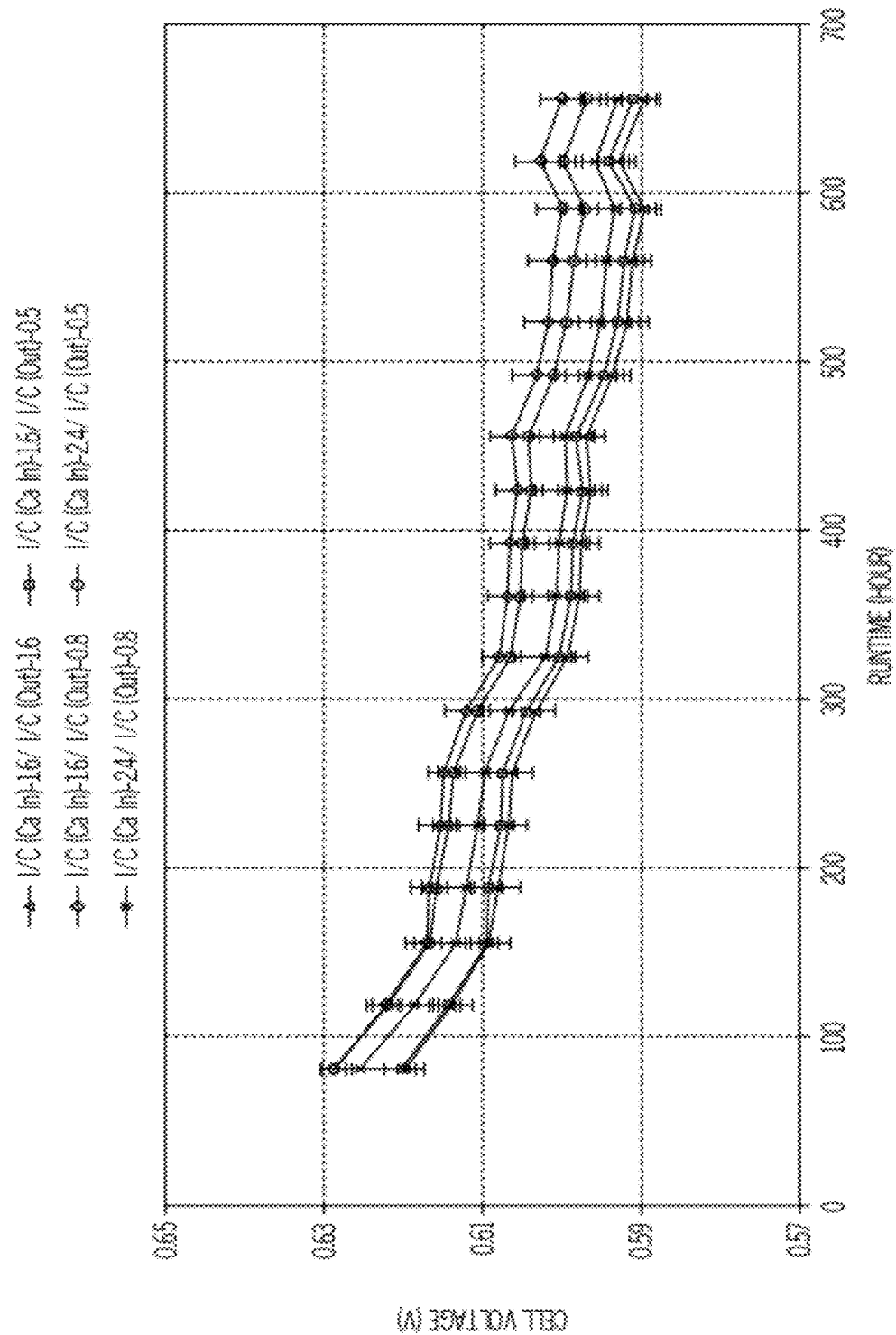
FIG. 6 is a graph showing the voltage degradation as a function of run time for parts having graded and uniform electrodes.

FIG. 6 shows the voltage degradation as a function of run time at 1.5 A/cm2 when operated at 80° C., with anode and cathode inlet RH of 30% and 45%, respectively. (The error bars show a 95% confidence level.) The graded parts show a similar degradation rate to that of the uniform parts.

As shown above, the graded electrodes demonstrate improvement in fuel cell performance under extremely dry conditions and cold, wet conditions without sacrificing fuel cell performance under nominal conditions or durability. These extreme conditions are commonly seen in fuel cell drive cycles, e.g., when starting a car on a cold day or when the car is driven on a short trip.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "device" is utilized herein to represent a combination of components and individual components, regardless of whether the components are combined with other components. For example, a "device" according to the present invention may comprise an electrochemical conversion assembly or fuel cell, a vehicle incorporating an electrochemical conversion assembly according to the present invention, etc.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. A method of making a graded electrode, the method comprising:

depositing a first electrode ink on a substrate to form a first electrode layer having a first ionomer to carbon ratio, wherein the substrate is a gas diffusion media or a polymer electrolyte membrane;

passing the substrate with the first electrode layer under a first blade having a first height at one end applied adjacent to a first side of the substrate and a second height at an opposite end applied adjacent to a second side of the substrate across from the first side, the first height of the first blade being less than the second height of the first blade, to remove a portion of the first electrode layer such that the thickness of the first electrode layer increases across the width of the substrate from the first side of the substrate to the second side of the substrate;

depositing a second electrode ink adjacent to the first electrode layer to form a second electrode layer having a second ionomer to carbon ratio different from the first ionomer to carbon ratio; and passing the substrate with the first and second electrode layers under a second blade having a first height at one end applied adjacent to the first side of the substrate and a second height at an opposite end applied adjacent to the second side of the substrate, the first height of the second blade being greater than the second height of the second blade, to remove a portion of the second layer such that the thickness of the second electrode layer decreases across the width of the substrate from the first side of the substrate to the second side of the substrate, a combined electrode layer formed from the first electrode layer and the second electrode layer having an average ionomer to carbon ratio that varies across the width of the substrate from the first side to the second side.

2. The method of claim 1, wherein a thickness of the combined electrode layer is constant across the width of the substrate from the first side to the second side.

3. The method of claim 1, wherein:

the first height of the first blade is substantially the same as the second height of the second blade;

the second height of the first blade is substantially the same as the first height of the second blade; and a thickness of the combined electrode layer is substantially constant across the width of the substrate from the first side to the second side.

4. A method of making a graded electrode, the method comprising:

depositing a first electrode ink on a substrate to form a first electrode layer having a first ionomer to carbon ratio and a thickness that is uniform across a width of the substrate, wherein the substrate is a gas diffusion media or a polymer electrolyte membrane;

removing a portion of the first electrode layer such that the thickness of the first electrode layer increases across the width of the substrate from a first side of the substrate to a second side of the substrate across from the first side of the substrate;

wherein the portion of the first electrode layer is removed by passing the substrate with the first electrode layer under a first slanted blade having a first height at one end applied adjacent to the first side of the substrate and a second height at an opposite end applied adjacent to the second side of the substrate, the first height of the first slanted blade being less than the second height of the first slanted blade;

depositing a second electrode ink over the first electrode layer after the portion of the first electrode layer is removed to form a second electrode layer having a second ionomer to carbon ratio different from the first ionomer to carbon ratio;

removing a portion of the second electrode layer to form an even upper surface of the second electrode layer, such that the thickness of the second electrode layer decreases across the width of the substrate from the first side of the substrate to the second side of the substrate;

wherein the portion of the second electrode layer is removed by passing the substrate with the first electrode layer and the second electrode layer under a second slanted blade having a first height at one end applied adjacent to the first side of the substrate and a second height at an opposite end applied adjacent to the second side of the substrate, the first height of the second slanted blade being greater than the second height of the second slanted blade;

whereby a combined electrode layer formed from the first electrode layer and the second electrode layer has an average ionomer to carbon ratio that varies across the width of the substrate from the first side of the substrate to the second side of the substrate.

5. The method of claim 4, further comprising drying the first electrode layer before depositing the second electrode ink.

6. The method of claim 4, wherein:

the first height of the first slanted blade is substantially the same as the second height of the second slanted blade;

the second height of the first slanted blade is substantially the same as the first height of the second slanted blade; and a thickness of the combined electrode layer is substantially constant across the width of the substrate from the first side to the second side.

7. The method of claim 4, wherein the substrate is a gas diffusion media that is wound on a roll and the method further comprises:

unwinding the substrate from the roll to cause the substrate to passed under the first blade and then under the second blade.

* * * * *